United States Patent [19]

Reasoner

[11] Patent Number: 5,280,733

[45] Date of Patent: Jan. 25, 1994

[54] REMOTE CONTROL ASSEMBLY INCLUDING SIDE-MOUNT CONNECTOR

[75] Inventor: Michael V. Reasoner, Davison, Mich.

[73] Assignee: Teleflex, Incorporated, Limerick, Pa.

[21] Appl. No.: 948,393

[22] Filed: Sep. 21, 1992

Related U.S. Application Data

[63] Continuation-in-part of Ser. No. 844,438, Mar. 2, 1992, Pat. No. 5,178,034.

[51] Int. Cl.⁵ .............................................. F16C 1/22
[52] U.S. Cl. ................................. 74/502.4; 74/502.6; 74/501.5 R
[58] Field of Search ............ 74/500.5, 501.5 R, 502.4, 74/502.6

[56] References Cited

U.S. PATENT DOCUMENTS

| | | | |
|---|---|---|---|
| 3,036,350 | 5/1962 | Hunt | 74/501.5 |
| 3,955,441 | 5/1976 | Johnson | 74/501.5 R |
| 4,177,691 | 12/1979 | Fillmore | 74/502.4 |
| 4,185,515 | 1/1980 | Webb | 74/501 P |
| 4,294,133 | 10/1981 | Hurley | 74/502.4 |
| 4,339,213 | 7/1982 | Gilmore | 74/501.5 R |
| 4,418,583 | 12/1983 | Taig | 74/501.5 R |
| 4,458,552 | 7/1984 | Spease et al. | 74/502.4 |
| 4,555,832 | 12/1985 | Sano et al. | 74/502.4 X |
| 4,635,498 | 1/1987 | Zimmermann et al. | 74/502.4 |
| 4,763,541 | 8/1988 | Spease | 74/501.5 R |
| 4,773,279 | 9/1988 | Spease | 74/502.4 |
| 4,785,686 | 11/1988 | Thomas | 74/502.4 |
| 4,805,479 | 2/1989 | Brightwell | 74/502.4 |
| 4,889,006 | 12/1989 | Kolinsk et al. | 74/502.6 X |
| 4,936,161 | 6/1990 | Pollando | 74/502.6 |
| 4,951,524 | 8/1990 | Niskanen | 74/502.4 |
| 5,138,898 | 8/1992 | Pospisil et al. | 74/502.6 |
| 5,161,428 | 11/1992 | Petruccello | 74/501.5 R |
| 5,178,034 | 1/1993 | Reasoner | 74/502.6 |

Primary Examiner—Leslie A. Braun
Assistant Examiner—Ryan W. Massey
Attorney, Agent, or Firm—Reising, Ethington, Barnard, Perry & Milton

[57] ABSTRACT

A motion transmitting remote control assembly (10) includes a flexible core element (14) slideably disposed within a conduit (12). A slider member (18) is molded to an end of the conduit (12) and extends slideably into a housing (20) for moving longitudinally relative thereto to adjust the overall effective length of the conduit (12). A locking member (86) is carried on the housing (20) and movable laterally relative to the slider member (18) for selectively engaging the slider member (18) to lock the assembly (10) in an adjusted condition. An anchor leg (112) extends from the side of the housing (20) for engaging an underside surface (116) of a support plate (110) when the housing (20) is slide longitudinally therealong. A locking projection (126) extends from the locking member (86) for engaging a slot (138) in the support plate (119) when the locking member (86) is engaged to prevent disconnection of the assembly from the support plate (110).

26 Claims, 4 Drawing Sheets

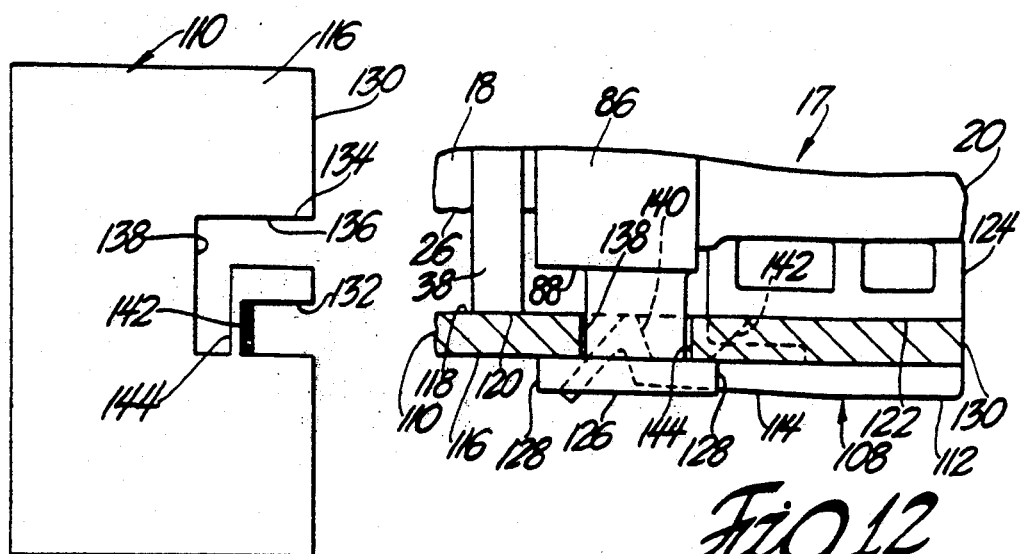

REMOTE CONTROL ASSEMBLY INCLUDING SIDE-MOUNT CONNECTOR

This is a continuation-in-part of copending application Ser. No. 07/844,438 filed on Mar. 2, 1992, now U.S. Pat. No. 5,178,034.

TECHNICAL FIELD

The invention relates to a motion transmitting remote control assembly of the type for transmitting motion in a curved path by flexible motion transmitting core element slideably disposed within a conduit. More specifically, the invention relates to such assemblies including a connection means for connecting the assembly to a plate.

RELATED PRIOR ART

Various mounting arrangements are known to the art for mounting a cable control assembly to a plate. Such mounting arrangements typically include a fitting, such as an end fitting or a conduit length adjustment device, secured to the conduit and provided with a connector for connecting the fitting to the plate.

In one arrangement, the conduit extends through a bulkhead and the fitting engages an aperture or slot in the bulkhead for securing the assembly to the bulkhead. Examples of such through-bulkhead connections are disclosed in U.S. Pat. Nos. 3,955,441 to Johnson, granted May 11, 1976; 4,294,133 to Hurley, granted Oct. 13, 1981; 4,339,213 to Gilmore, granted Jul. 13, 1982; 4,418,583 to Taig, granted Dec. 6, 1983; 4,763,541 to Spease, granted Aug. 16, 1988; 4,773,279 to Spease et al, granted Sept. 27, 1988; 4,936,161 to Pollando, granted Jun. 26, 1990; and 4,951,524 to Niskanen, granted Aug. 28, 1990.

It is not, however, always possible to connect a cable control assembly to a plate in this manner. In some applications, it is required that the cable assembly be side-mounted to the plate. The U.S. Pat. Nos. 4,185,515 to Webb, granted Jan. 29, 1980; and 4,805,479 to Brightwell, granted Feb. 21, 1989 disclose fittings for mounting a cable assembly in such a manner. Both fittings have snap-in connectors projecting transversely of the cable assembly for push-and-snap retention with an aperture of the plate. In some applications, however, the routing of the cable assembly does not provide enough room to enable a push-and-snap connector to be used.

SUMMARY OF THE INVENTION AND ADVANTAGES

A motion transmitting remote control assembly comprises a conduit, a flexible core element movably supported by the conduit for transmitting motion, and fitting means having a longitudinal axis and connected to the conduit for attachment to a plate. Connecting means are provided for removably connecting the fitting means to the plate in response to sliding the fitting axially along the plate. Locking means are provided and moveable transversely relative to the longitudinal axis for engaging the plate and locking the fitting means against disconnection from the plate.

The invention advantageously allows the cable assembly to be slid longitudinally into engagement with the plate and then locked against disconnection by the transversely moveable locking means. When installing such remote control assemblies, an operator applies forces along the length of the assembly, such as when connecting the ends of the core element to the control member and member to be controlled. The axially slidable connecting means coordinates with such movements of the assembly enabling the operator to quickly and conveniently slide the fitting means into engagement with the plate while connecting the core element. The locking means quickly and securely locks the fitting means against disconnection.

BRIEF DESCRIPTION OF THE DRAWINGS

Other advantages of the present invention will be readily appreciated as the same becomes better understood by reference to the following detailed description when considered in connection with the accompanying drawings wherein:

FIG. 9 is a bottom view of the support plate;

FIG. 10 is a rear perspective view of the assembly attached to the support plate with the locking member in the unlocked position;

FIG. 11 is a view like FIG. 10 but with the locking assembly in the locked position; and FIG. 12 is a fragmentary cross-sectional view of the locking assembly and plate.

DETAILED DESCRIPTION OF THE DRAWINGS

Figure 1:
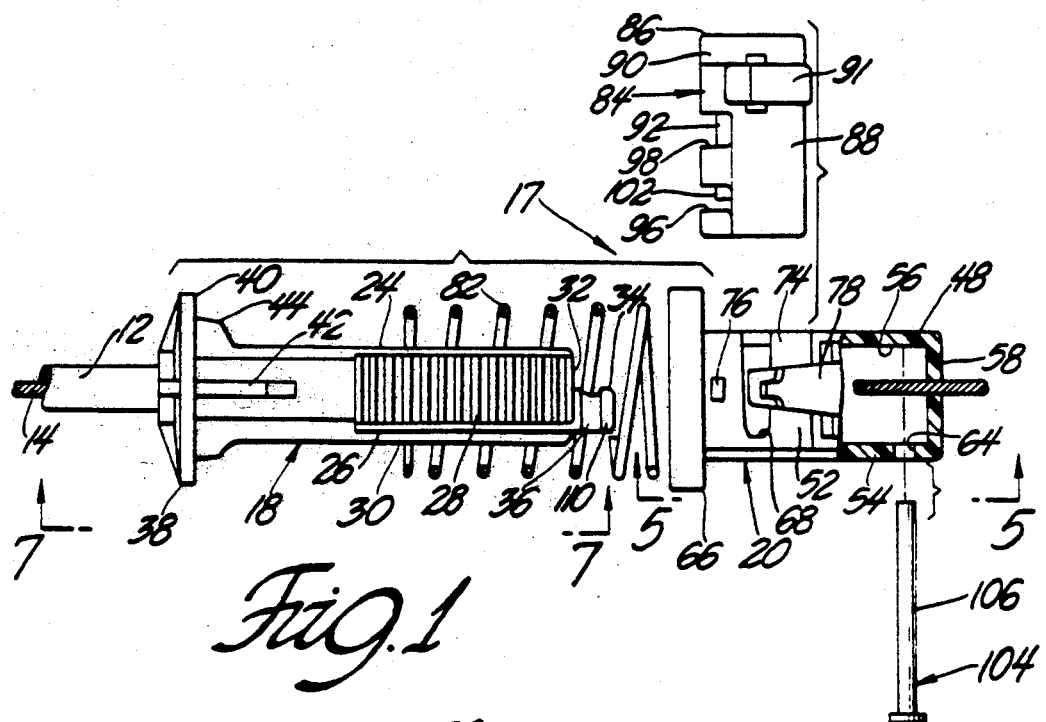
FIG. 1 is an exploded view of the remote control assembly.

Referring now to the drawings, a motion transmitting remote control assembly constructed in accordance with the instant invention is generally shown at 10. The assembly 10 includes a tubular conduit 12 and a flexible motion transmitting core element 14 which is movably supported by the tubular conduit 12. The tubular conduit 12 has a length and a central axis 16. The core element 14 has a length and a central axis, with the axes of the conduit 12 and core element 14 being generally coincidental, and, for all practical purposes, the same axis 16. The tubular conduit 12 is preferably of the known type utilized in remote control assemblies including an inner tubular member over an organic polymeric material surrounded by a plurality of filaments or long lay wires disposed on a long lead and encased in an outer jacket of organic polymeric material. The organic polymeric material may be of the various know plastics such as polyethylene, etc.

The assembly 10 includes fitting means 17 and more particularly a conduit length adjustment device attached to the conduit 12 for adjusting the overall effective end-to-end length of the conduit 12. The conduit length adjustment device 17 includes a slider member 18 connected to an end of the conduit 12 and slideably disposed within a housing 20 and axially movably disposed with respect to one another for allowing adjustment between a minimum length position and a maximum length position of the conduit 12.

The slider member 18 has a central passageway aligned with the conduit 12 and movably supporting the core element 14. In this way, the slider member 18 acts as an extension of the conduit 12. The slider member 18 and housing 20 are preferably fabricated of organic polymeric material and may be formed by injection molding.

Figure 7:
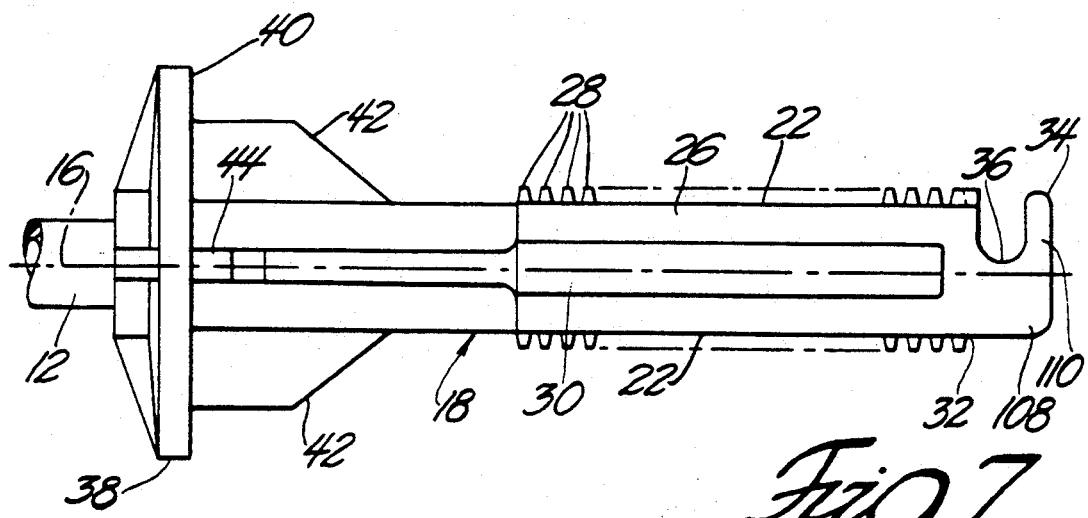
FIG. 7 is a side view of the slider member taken along lines 7—7 of FIG. 1.

As shown in FIGS. 1 and 7, the slider member 18 extends between opposite ends and includes oppositely facing parallel side walls 22 extending longitudinally of the central axis 16 and a pair of oppositely facing parallel first 24 and second 26 connecting surfaces extending between and connecting the side walls 22. Disposed on the side walls 22 are a plurality of incrementally spaced adjustment teeth 28 which extend vertically between the first 24 and second 26 connecting surfaces. An alignment rib 30 is disposed on the second connecting surface 26 extending longitudinally of the central axis 16.

An end 32 of the slider member includes a hook 34 which forms a socket 36. The hook 34 extends transversely between the axis 16 and second connecting surface 26, as best shown in FIG. 1. The hook 34 therefore is noncentered or offsettingly disposed on the end 32. A flange 38 extends outwardly from the slider member 18 and is spaced from the sidewalls 22, first 24 and second 26 connecting surfaces, and the end 32 and a seating surface 40. At least one strengthening rib 42 extends longitudinally from the seating surface 40 of the flange 38 along the slider member 18. Further, a pair of fins 44 are disposed on the slider member 18 and extend outwardly adjacent to the seating surface 40.

The housing 20 has longitudinally extending slide walls including a roof 48, a pair of first and second lateral walls 50, 52 spaced from one another and extending downwardly from the roof 48, and a floor 54 spaced from the roof 48 and interconnecting the first 50 and second 52 lateral walls thereby forming a housing receptacle or channel 56 for slideably receiving the slider member 18. The housing 20 also includes a closed end 58 and an open end 60 with the channel 56 extending therebetween. The slider member 18 is received in the channel 56 through the open end 60.

The channel 56 includes an alignment groove 62 disposed on the floor 54 which extends longitudinally of the central axis 16 for receiving the alignment rib 30 to orient the member 18 within the channel 56 such that the first 24 and second 26 connecting surfaces are disposed adjacent and parallel to the roof 48 and floor 54, respectively, of the housing 20. The adjustment teeth 28 are spaced from the first 50 and second 52 lateral walls. The housing 20 further includes a transverse hole 64 which extends through the floor 54 of the housing 20 and is spaced between the alignment groove 62 and the first lateral wall 50 and is adjacent to the closed end 58. An annular lip or collar 66 is disposed about the open end 60 of the housing 20 and projects radially outwardly therefrom.

The housing 20 further includes vertical receiving slots 68 extending transverse to the central axis 16 and through each of the first 50 and second 52 lateral walls. The receiving slot 68 is disposed adjacent to the open end 60. The vertical receiving slot 68 extends from the roof 48 to a termination point adjacent to the floor 54 of the housing 20. The housing 20 includes a pair of roof slots 70 extending through the roof 48 of the housing 20 and longitudinally of the central axis 16 adjacent to the vertical receiving slots 68. The housing 20 also includes a pair of floor slots 72 extending through the floor 54 between the alignment groove 62 and the first 50 and second 52 lateral walls.

The housing 20 has an external surface 74. A detent 76 is disposed on the external surface 74 of the first 50 and second 52 lateral walls and is spaced between the vertical receiving slots 68 and the lip 66.

Biasing means, generally indicated at 80, is provided for allowing automatic adjustment between a minimum length position and a maximum length position of the conduit 12. The biasing means 80 includes a compression spring 82 reacting between the slider member 18 and housing 20 for urging the slider member 18 and housing 20 toward the maximum length position (i.e., tending to increase the overall effective length of the conduit 12). This, in turn, causes the slack in the core element 14 to be taken up so that both the actuator and member to be controlled reach their terminal end stroke positions at exactly the same time. The compression spring 82 is seated between the collar 66 and seating surface 40. The fins 44 prevent lateral movement of the compression spring 82 on the seating surface 40.

To maintain the adjusted condition, the adjusting means is provided with locking means 84. The locking means 84 comprises a locking member 86 supported on the housing 46 and received in the vertical receiving slot 68. The locking member 86 is selectively movable laterally relative to the slider member 18 between an unlocked position in which the locking member 86 is disengaged with the slider member 18 for permitting the slider member 18 to move in the channel 56 and a locked position in which the locking member 86 is lockably engaged with the slider member 18 to lock the slider member 18 against movement in the channel 56.

The locking member 86 is generally U-shaped and includes a pair of vertically extending outer side arms 88 straddling the housing 20 and joined by a crosspiece 90 extending between the arms 88. Parallel and spaced inwardly from each arm 88 is an inner wall 92. A connecting rib 94 connects each inner wall 92 to its corresponding outer wall 88. When the member 86 is disposed on the housing 46, the arms 88 are adjacent to the external surface 74 of the housing 46 and the inner walls 90 are received by the roof slots 70. The inner wall 92 therefore extend into the housing receptacle 56 and are spaced between the sidewalls 22 of the slider member 18 and the first 50 and second 51 lateral walls of the housing 20. The connecting rib 94 is slidably disposed in the vertical receiving slots 68.

Figure 3:
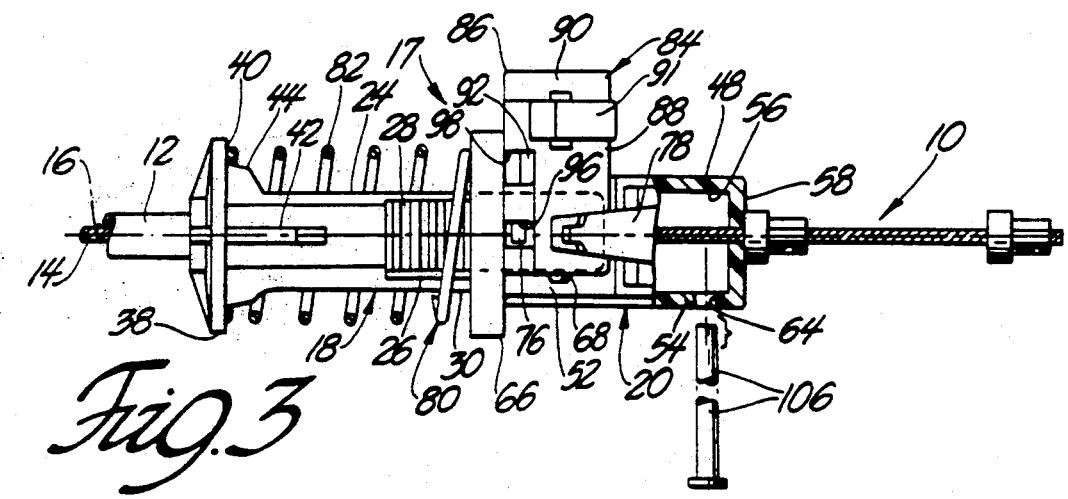
FIG. 3 is a side view as in FIG. 2 showing the release pin removed and the first conduit section moved toward the maximum length position with the locking means disengaged from the adjustment teeth.
Figure 4:
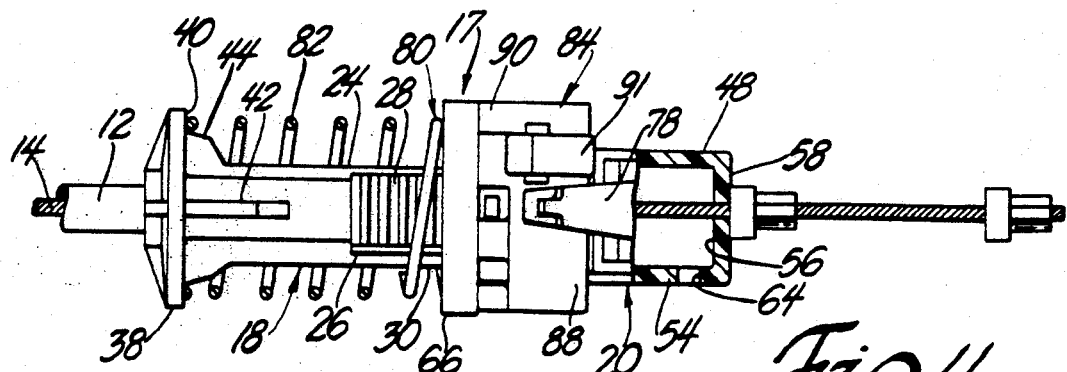
FIG. 4 is a side view of the assembly with the slider member moved toward the maximum length position and the locking means engaged with the adjustment teeth.
Figure 5:
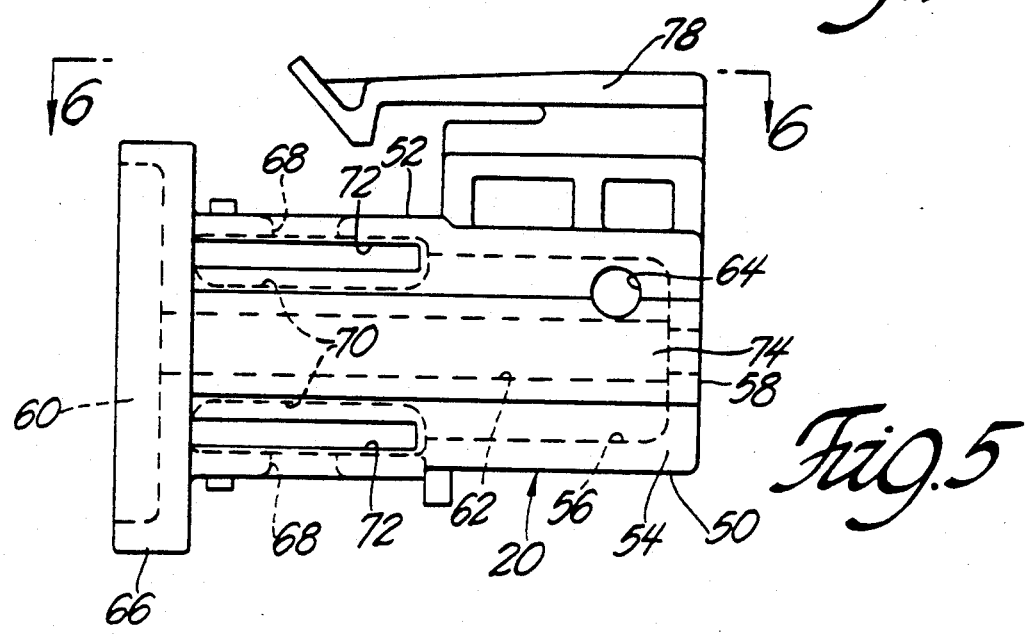
FIG. 5 is a bottom view of the housing as taken along lines 5—5 of FIG. 1.
Figure 6:
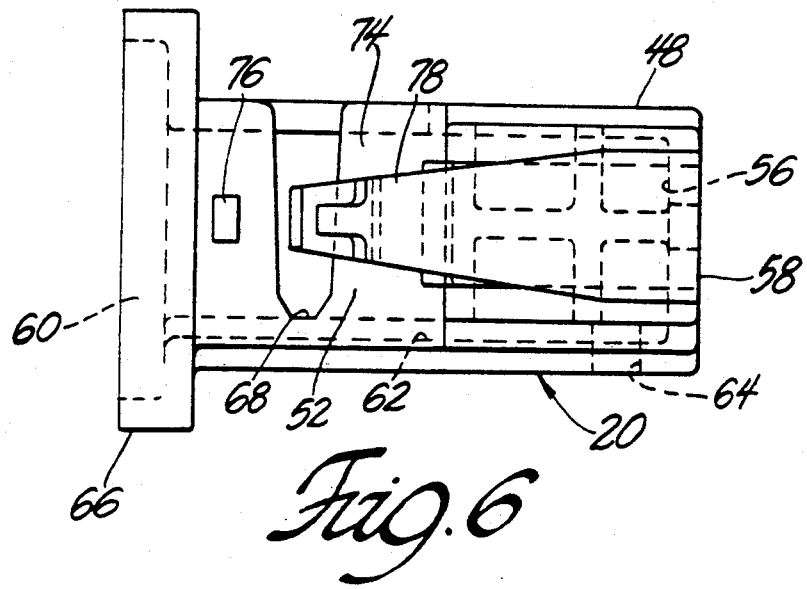
FIG. 6 is a side view of the housing as taken along lines 6—6 of FIG. 5.

The locking member 86 further includes a lower notch 96 and an upper notch 98 disposed on each of the arms 88 for receiving the detent 76 disposed on the housing 20 as the member 86 moves in the vertical receiving slot 68. The upper notch 98 is spaced vertically from the lower notch 96 and is adjacent to the crosspiece 90. The locking member 86 is supported in the unlocked position when the detent 76 is received in the lower notch 96. The upper notch 98 is spaced above the roof 48 of the housing 20 in the disengaged position as shown in FIG. 3. The locking member 86 is supported in the locked position when the detent 76 is received in the upper notch 98 and the crosspiece 90 is adjacent to the roof 48 of the housing 20, as best shown in FIG. 4.

Figure 2:
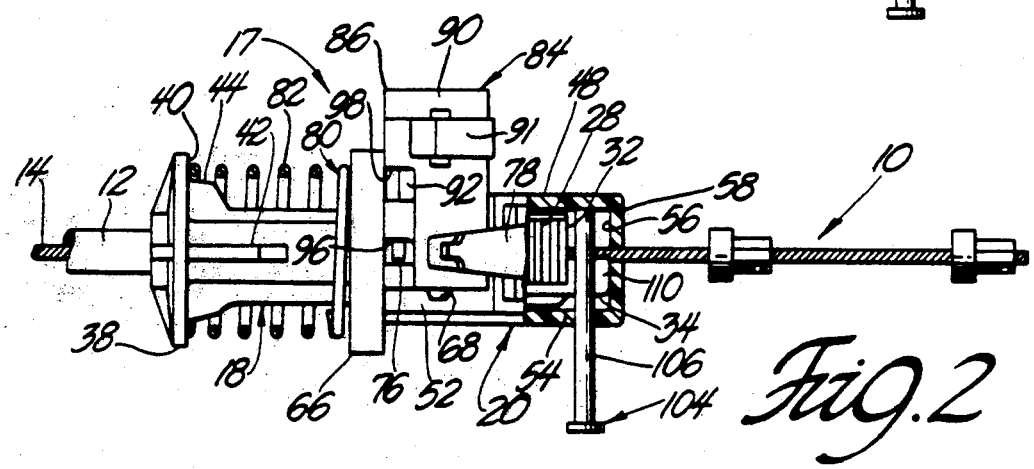
FIG. 2 is a side view of the assembly shown in partial cross section secured in the minimum length position with the locking means disengaged from the adjustment teeth.

The locking member 86 includes a plurality of locking teeth 100 disposed on each of the inner walls 92, extending longitudinally of the central axis 16, and parallel to the upper notches 98. The locking teeth 100 extend out from the inner walls 92 into the channel 56 to engage the teeth 28 in the locked position to selectively lock the slider member 18 and housing 20 in one of several adjusted positions. In the unlocked position, the locking teeth 100 are disposed above the housing 45, as best shown in FIGS. 2 and 3.

Figure 8:
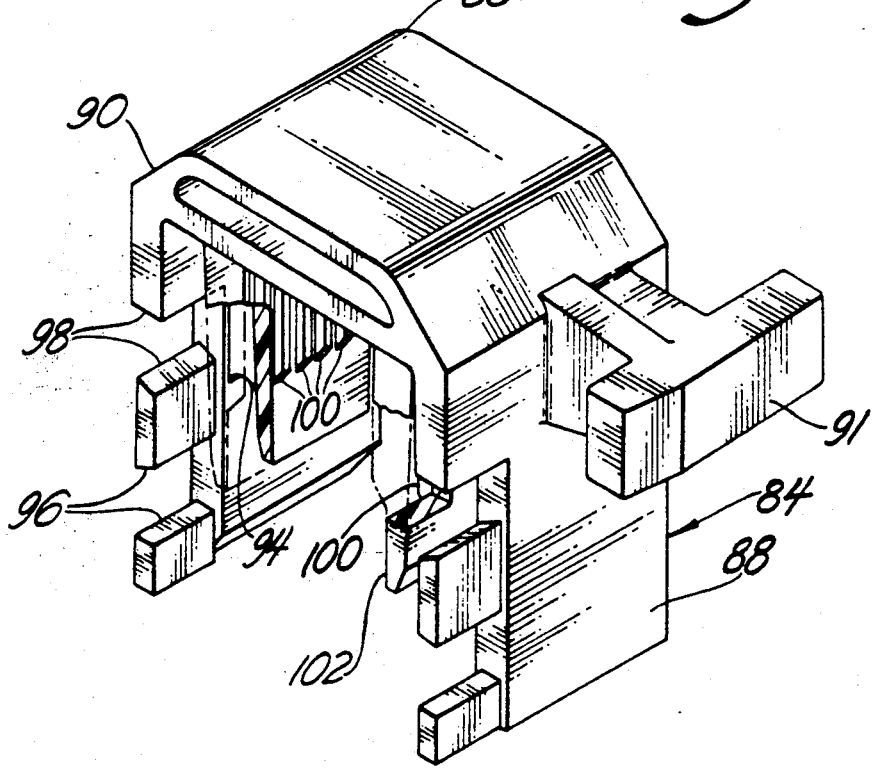
FIG. 8 is an enlarged, perspective view of the locking member.

Each inner wall 92 includes at least one guide 102, extending longitudinally of the central axis 16, and extending transversely downwardly toward the floor 54 of the housing 20 from the locking teeth 100 and parallel to the lower notches 96 for guiding the slider member 18 in the channel 56 when the locking member 86 is in the unlocked position. The guide 102 is disposed between the adjustment teeth 28 and the first 50 and second 52 lateral walls in the unlocked position. The locking teeth 100 extend further from the inner wall than the guide 102, thus providing an internally stepped, or offset, appearance as shown in FIG. 8. The locking teeth 100 and guides 102 are therefore laterally offset relative to the central axis 16.

Securing means, generally indicated at 104, is disposed between the slider member 18 and housing 20 for maintaining the slider member 18 and housing 20 in the minimum length position during shipping with the locking means 84 disengaged from the slider member 18. The securing means 104, upon release enables the slider member 18 and housing 20 to automatically extend toward the maximum length position by action of the spring 82.

The securing means 104 includes the hook 34, the socket 36, and the hole 64. The securing means 104 also includes a release pin 106. In the minimum length position, the socket 36 is aligned with the transverse hole 64 and the spring 82 is compressed. To maintain the assembly 10 in this position, the pin 106 is extended through the hole 64 and received in the socket 36 to prevent relative movement between the sliding member 18 and housing 20. Once the assembly 10 is installed in a vehicle, the release pin 106 is withdrawn enabling the spring 82 to adjust the assembly 10 to the proper position. The locking member 84 is then slid into locking engagement with the slider member 18 to lock the assembly 10 in the adjusted condition.

The assembly 10 further includes mounting means for side-mounting the adjustment device 17 to a plate 110. The mounting means includes connecting means 108 for removably connecting the length adjustment device to the plate in the preferred form of a plate 110 in response to sliding the adjustment device 17 axially (i.e., in a direction along its longitudinal axis) along the plate 110. The connecting means 108 comprises a generally L-shaped anchor leg 112 formed integrally with the housing 20 and projecting laterally therefrom adjacent the far end of the housing 20 away from the conduit 12. The leg 112 includes a foot 114 extending longitudinally along the housing 20 toward the conduit 12 for underlying and engaging an underside surface 116 of plate 110 when the adjustment device 17 is slid along an opposing top surface 118 of the plate 110.

The assembly 10 further includes abutment means in the preferred form of a pair of abutment shoulders 120, 122 projecting laterally from the housing 20 on opposite axial sides of the locking member 86 for engaging the top surface 118 of the plate 110 when slidingly engaged therewith, as seen best in the FIG. 12. The peripheral edge of the annular collar 38 defines one of the abutment surfaces 120, whereas the other shoulder 122 is defined by an outer surface of a boss 124 formed integrally with the housing 20 and extending transversely therefrom on the same side of the housing 20 as the anchor leg 112 adjacent the far end of the housing 20. The shoulders 120, 122 support the locking member 86 away from the top surface 118 of the plate 110 so as to enable operation of the locking member 86 when the adjustment device 17 is slidingly engaged with the plate 110. In particular, when mounted, the locking member 86 is able to move generally parallel in relation to the top surface 118 of the plate 110.

The locking means 86 is also part of the mounting means and is movable transversely relative to the longitudinal axis of the adjustment mechanism 17 for engaging the plate 110 and locking the adjustment device 17 against disconnection from the plate 110. The locking means includes a locking projection 126 extending from the locking member 86 for lockingly engaging the plate 110 when the member 86 is moved toward locking engagement with the slider member 18. The projection 126 is spaced axially from the anchor leg 112 and is generally T-shaped including locking feet 128 extending longitudinally in opposite directions along the adjustment device 17. In particular, the locking length of the projection 126 projects outwardly from one of the side arms 88 of locking member 86 in the same transverse direction as the anchor leg 112.

The plate has an edge 130 extending perpendicularly between the top 118 and underside 116 surfaces of the plate 110. When the device 17 is mounted to the plate 110, the longitudinal axis of the device 17 is parallel to and spaced from the top surface 118. That is, the device 17 is side-mounted to the plate 110 and extends therealong.

The foot 114 of anchor leg 112 and the feet 128 of projection 126 are transversely spaced from the abutment shoulders 120, 122 a distance corresponding substantially to the thickness of the plate 110. Extending into the plate 110 from the edge 130 thereof is a rectangular connecting slot 132 disposed generally normal to the edge 130. An L-shaped locking slot 134 also extends in from the edge 130 of the plate 110 and includes a first portion 136 extending normal to the edge 130 and spaced from the connecting slot 132 and a second portion 138 extending normal to the first portion 136 and thus generally parallel and spaced from the edge 130 of the plate 110. The preferred arrangement of the slots 132, 134 is best seen in FIG. 9.

As best seen in FIG. 10, the connecting slot 132 slideably receives the anchor leg 112 therein upon sliding the adjustment device 17 longitudinally along the top surface 118 of the plate. The first portion 136 of the locking slot 134 likewise receives the locking projection 126 therein, when the locking member 86 is positioned in the raised unlocked position, as the adjustment device 17 is slid into engagement with the support plate 110. The second portion 138 of slot 134 extends behind the connecting slot 132 (FIG. 9) for receiving a snap-lock projection 140 formed on the free end of the foot 114 of anchor leg 112 which extends inwardly toward the housing 20. The foot 114 is flexible enabling the snap-in projection 140 to cammingly engage a ramping backwall 142 of the connecting slot 132 when the adjustment device 117 is slid along the support plate 110 causing the foot 114 to deflect outwardly of the housing 20 for lessening the force required to slideably force the snap-in projection 140 into engagement with the connecting slot 132.

When received in the connecting slot 132, the snap-in projection 140 offers about 20 ft-lbs resistance to retrograde longitudinal sliding movement of the adjustment device 17 out of engagement with the support plate 110. In some applications, however, it is likely that the adjustment device 17 will be subjected to retrograde disconnecting forces (i.e. forces directed in the opposite direction of sliding engagement) exceeding the available holding force provided by the snap-in projection 140. An additional 100 ft-lbs of supplemental holding force is provided by positioning the locking projection 126 within the second portion 138 of slot 134. This is accomplished by simply moving the locking member 86 into locking engagement with the slider member 18. This action causes the locking projection 126 to move from the position shown in Figure 10 to that shown in FIG. 11. As a result, any retrograde longitudinal sliding forces applied to the adjustment device 17 are born by the locking projection 126 bearing against a side wall 144 of second slot portion 138 extending substantially normal to said connecting slot 132 and disposed opposite the plate edge 130.

When the device 17 is fully connected to the support plate 110, the feet 128 of the locking projection 126 engaged the underside 116 of the plate 110 on either side of the second slot portion 138 and the foot 114 of the anchor leg 112 likewise engages the underside 116 of the plate 110 on either side of the connecting slot 132 for cooperating with the abutment shoulders 120, 122 to securely retain the adjustment device 17 tightly against the support plate 110 and resist any torsion forces that may be applied to the adjustment device which would tend to pull the adjustment device 17 away from the top surface 118 of the support 112.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

I claim:

1. A motion transmitting remote control assembly of the type for transmitting forces by a motion transmitting core element, said assembly comprising:
   a conduit (12);
   a flexible core element (14) movably supported by said conduit (12) for transmitting motion;
   fitting means (17) having a longitudinal axis (16) and connected to said conduit (12) for attachment to a plate (110);
   connecting means (108) for removably connecting said fitting means (17) to the plate (110) in response to sliding said fitting means (17) axially along the plate (110);
   and characterized by locking means (84) movable transversely relative to said longitudinal axis (16) for engaging the plate (110) and locking said fitting means (17) against disconnection from the plate (110).

2. An assembly as set forth in claim 1 further characterized by said fitting means (17) comprising a conduit length adjusting device including a slider member (13) connected to said conduit (12) and having locking teeth (28) formed thereon, and a housing (20) slideably supporting said slider member (13), and wherein said locking means (84) comprises a locking member (86) supported by said housing (20) and provided with locking teeth (100) for moving transversely relative to said slider member (18) between an unlocked position in which said locking teeth (100) of said locking member (86) are disengaged from said teeth (23) of said slider member (86) for allowing said slider member (86) to slide freely relative to said housing (20) for adjusting the effective length of said conduit (12) to a selected one of a plurality of adjusted positions and a locked position in which said locking teeth (28,100) are engaged for locking said slider member (18) against said sliding movement to retain said adjustment device (17) in said selected position of adjustment.

3. An assembly as set forth in claim 2 further characterized by said connecting means comprising an anchor leg (112) projecting from said housing (20) for slideably engaging the plate (110).

4. An assembly as set forth in claim 3 further characterized by said locking means (84) including a locking projection (126) extending from said locking member (86) and moveable transversely therewith for engaging a slot (134) of the plate (110) when said locking member (134) is moved to said locked position to lock said adjustment device (17) against retrograde disconnecting sliding movement.

5. An assembly as set forth in claim 4 further characterized by said housing (20) including abutment means for engaging a top surface (113) of the plate (110), and said anchor leg (112) including a foot portion (114) extending longitudinally along said housing (20) and spaced laterally from said abutment means for underlying and engaging an underside surface (116) of the plate (110) when said adjustment device (17) is slid longitudinally along the top surface (118) of the plate (110).

6. An assembly as set forth in claim 5 further characterized by said slider member (18) being connected to an end of said conduit (12).

7. An assembly as set forth in claim 6 further characterized by said anchor leg (112) extending longitudinally toward said conduit (12).

8. An assembly as set forth in claim 5 further characterized by said anchor leg (112) being L-shaped.

9. An assembly as set forth in claim 8 further characterized by said locking projection (126) being T-shaped.

10. An assembly as set forth in claim 5 further characterized by said locking projection (126) being spaced axially from said anchor leg (112).

11. An assembly as set forth in claim 5 further characterized by said abutment means comprising a pair of abutment shoulders (120,122) projecting laterally from said housing (20) on opposite axial sides of said locking member (86).

12. An assembly as set forth in claim 11 further characterized by one of said abutment shoulders (120) comprising an annular radially extending collar (38) disposed on an end of said housing (20).

13. An assembly as set forth in claim 12 further characterized by the other one of said abutment shoulders (122) comprising a boss (124) formed on an opposite end of said housing (20).

14. An assembly as set forth in claim 13 further characterized by said abutment shoulders (120,122) supporting said locking member (86) away from the plate (110).

15. An assembly as set forth in claim 5 further characterized by said foot (114) of said anchor leg (112) being flexible and including a snap-in projection (140) extending toward said housing (20).

16. An assembly as set forth in claim 4 further characterized by said locking member (86) being generally U-shaped and straddling said housing (20).

17. An assembly as set forth in claim 16 further characterized by said locking member (86) including a pair of spaced apart side arms (88) and a connecting wall (90) extending between said arms (88).

18. An assembly as set forth in claim 17 further characterized by each of said side arms (88) including said locking teeth (100) of said locking member (84) and said slider member (18) having said respective locking teeth (26) formed on corresponding opposite side walls thereof for engaging said side arm teeth (100).

19. An assembly as set forth in claim 5 further characterized by said assembly including a plate (110) for mountingly receiving said adjustment device (17), said plate (110) comprising a plate having planer top (118) and underside (115) surfaces and an edge (130).

20. An assembly as set forth in claim 19 further characterized by said longitudinal axis (16) of said adjustment device (17) extending parallel to said plate (110) when said adjustment device (17) is mounted to said plate (110).

21. An assembly as set forth in claim 19 further characterized by said plate (110) including a connecting slot (132) extending from said edge (130) into said edge (110) for slideably receiving said anchor leg (112).

22. An assembly as set forth in claim 21 further characterized by said plate (110) including an L-shaped locking slot (134) having a first portion (136) thereof extending into said plate (110) from said edge (130) and spaced from said connecting slot (132) for receiving said locking projection (126) therein once said adjustment device (17) is slid into engagement with said plate (110), and a second portion (138) thereof disposed normal to said first portion (136) and spaced from said plate edge (130) for receiving said locking projection (136) therein upon moving said locking member (86) into locking engagement with said slider member (18).

23. An assembly as set forth in claim 22 further characterized by said second slot portion (138) having a side wall (144) thereof extending substantially normal to said connecting slot (132) for an engaging said locking projection (126) when in said locked condition to prevent retrograde sliding disconnection of said adjustment device (17).

24. An assembly as set forth in claim 22 further characterized by said locking projection (126) engaging said underside surface (116) of said support plate (110) on either side of said locking slot (134) to prevent said adjustment device (17) from being pulled away from said support plate (110).

25. An assembly as set forth in claim 22 further characterized by said foot portion (114) of said anchor leg (112) being flexible and including a snap-in projection (140) extending inwardly toward said housing (20).

26. An assembly as set forth in claim 25 further characterized by said second slot portion (138) extending beneath said connecting slot (132) and engaging said snap-in projection (140) when said adjustment device (17) is slid fully into longitudinal engagement with said support plate (110) for resisting retrograde sliding removal of said adjustment device (17).

* * * * *